United States Patent [19]
Williams et al.

[11] Patent Number: 5,141,376
[45] Date of Patent: Aug. 25, 1992

[54] SELF DRILLING SCREW

[75] Inventors: John J. Williams, Oxford, Mich.; Frank Piacenti; William H. Sublett; Robert W. Brown, Jr., all of Campbellsville, Ky.

[73] Assignee: Emhart Inc., Newark, Del.

[21] Appl. No.: 830,109

[22] Filed: Feb. 3, 1992

[51] Int. Cl.⁵ ............................................. F16B 25/00
[52] U.S. Cl. ................................... 411/387; 411/411; 411/416
[58] Field of Search ............... 411/387, 386, 411, 412, 411/413, 415, 416

[56] References Cited

U.S. PATENT DOCUMENTS

| | | | |
|---|---|---|---|
| 2,479,730 | 8/1949 | Dewar | 411/387 |
| 3,125,923 | 3/1964 | Hanneman | 411/386 |
| 3,288,015 | 11/1966 | Hanneman | 411/387 |
| 3,426,642 | 2/1969 | Phipard, Jr. | 10/10 R |
| 4,749,322 | 6/1988 | Sygnator | 411/387 |
| 4,781,503 | 11/1988 | Bogel | 411/368 |
| 4,781,506 | 11/1988 | Roberts et al. | 411/387 |

FOREIGN PATENT DOCUMENTS

| | | | |
|---|---|---|---|
| 696358 | 10/1964 | Canada | 411/387 |
| 292734 | 11/1988 | European Pat. Off. | |
| 1337952 | 4/1963 | France | 411/411 |

Primary Examiner—Rodney M. Lindsey
Attorney, Agent, or Firm—Spencer T. Smith

[57] ABSTRACT

A self drilling screw for thin metal applications. The screw has a small point for drilling a hole in the thin metal and a substantially larger diameter non-tapered threaded section. Between these portions is an extended length taper having a plurality of thread pitches each including swaging lobes.

5 Claims, 2 Drawing Sheets

SELF DRILLING SCREW

BACKGROUND OF THE INVENTION

The present invention relates to self drilling screws and more particularly to self drilling screws for thin metal applications.

FIELD OF THE INVENTION

In conventional self drilling screws, the drill point drills a hole about the size of the root diameter of the screw, i.e., the drill point is intended to duplicate the action of a separate drill which would normally drill a hole for a standard screw. When such self drilling screws are used in thin metal applications (metal sheet having a thickness less than 0.060 inches) hole size varies from screw to screw and therefore strip out torque also varies from hole to hole. When self-piercing screws are used in thin wall applications, the screws fail to pierce the material 100% of the time and when they do, strip out torque is very low. This problem becomes more and more acute as the thickness of metal sheet decreases due to market demands.

SUMMARY OF THE INVENTION

It is accordingly, an object of the present invention to provide a self drilling screw for thin wall applications which will have a consistent and substantially higher strip out torque.

It is also an object to improve the drive to stripout ratios for such screws.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWINGS

Referring to the drawings.

DESCRIPTION OF THE PREFERRED EMBODIMENT(S)

Figure 1:
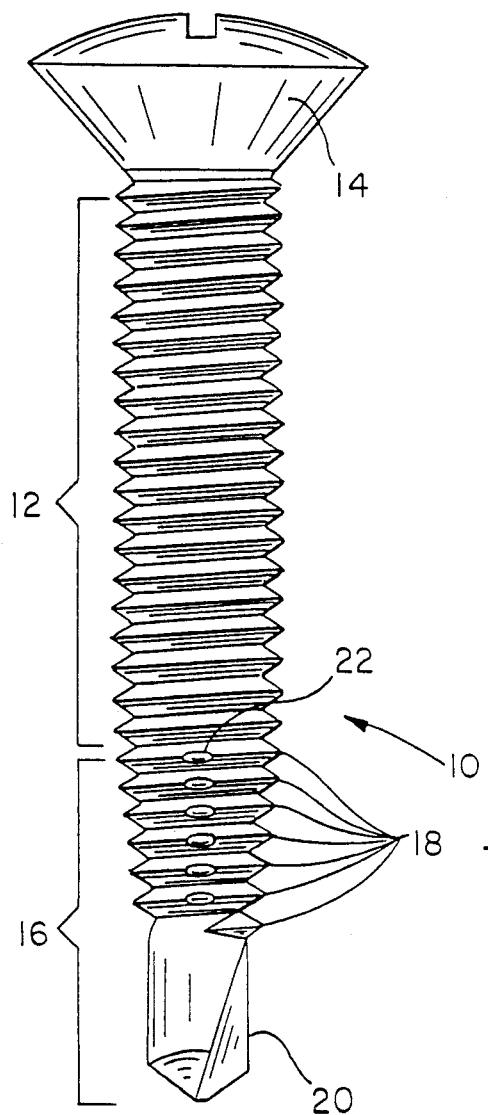
FIG. 1 is a side view of a self drilling screw made in accordance with the teachings of the invention.
Figure 2:
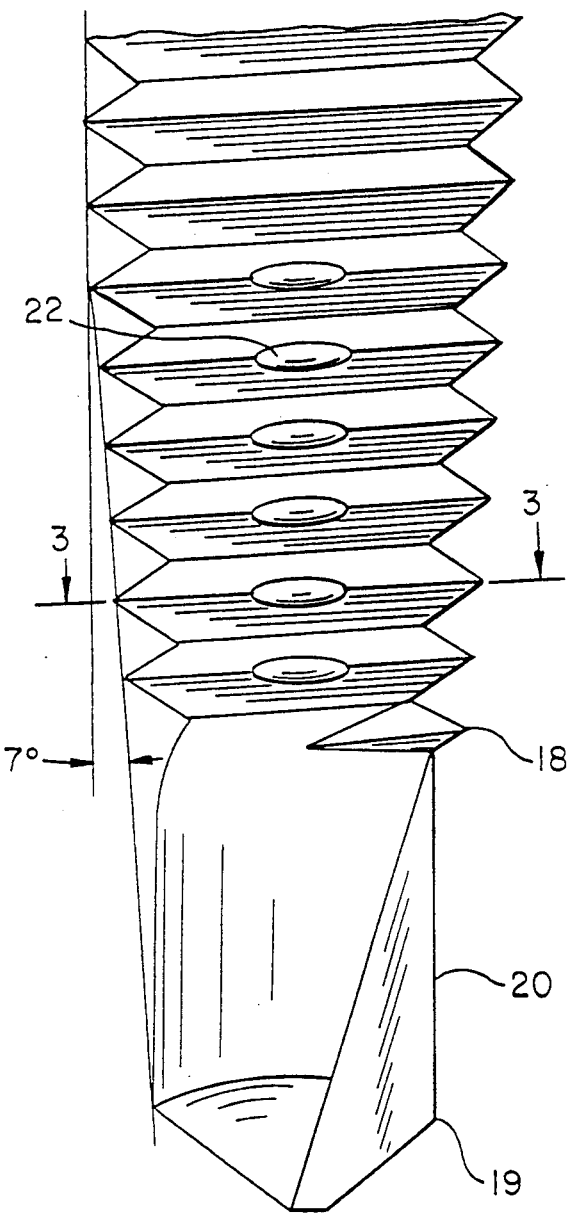
FIG. 2 is an enlarged view of the cutting end of the self drilling screw illustrated in FIG. 1.
Figure 3:
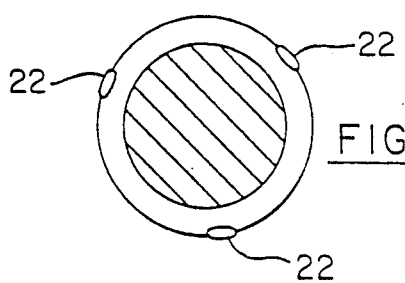
FIG. 3 is a view taken at 3—3 of FIG. 1.

The self drilling screw 10 (FIG. 1) has a central non-tapered threaded portion 12 between a head 14 at one end and a tapered portion 16 at the other end. The taper (FIG. 2) extends for a plurality of thread pitches (six-seven in the illustrated embodiment and preferably four or more) and then to the front edge 19 of the cutting point 20. Three rows of 120° of spaced swaging lobes 22 (FIG. 3) are provided on the threads 18 within the taper to help open the material and promote consistent tapping. It may also prove desirable to define these lobes along the entire screw.

Figure 4:
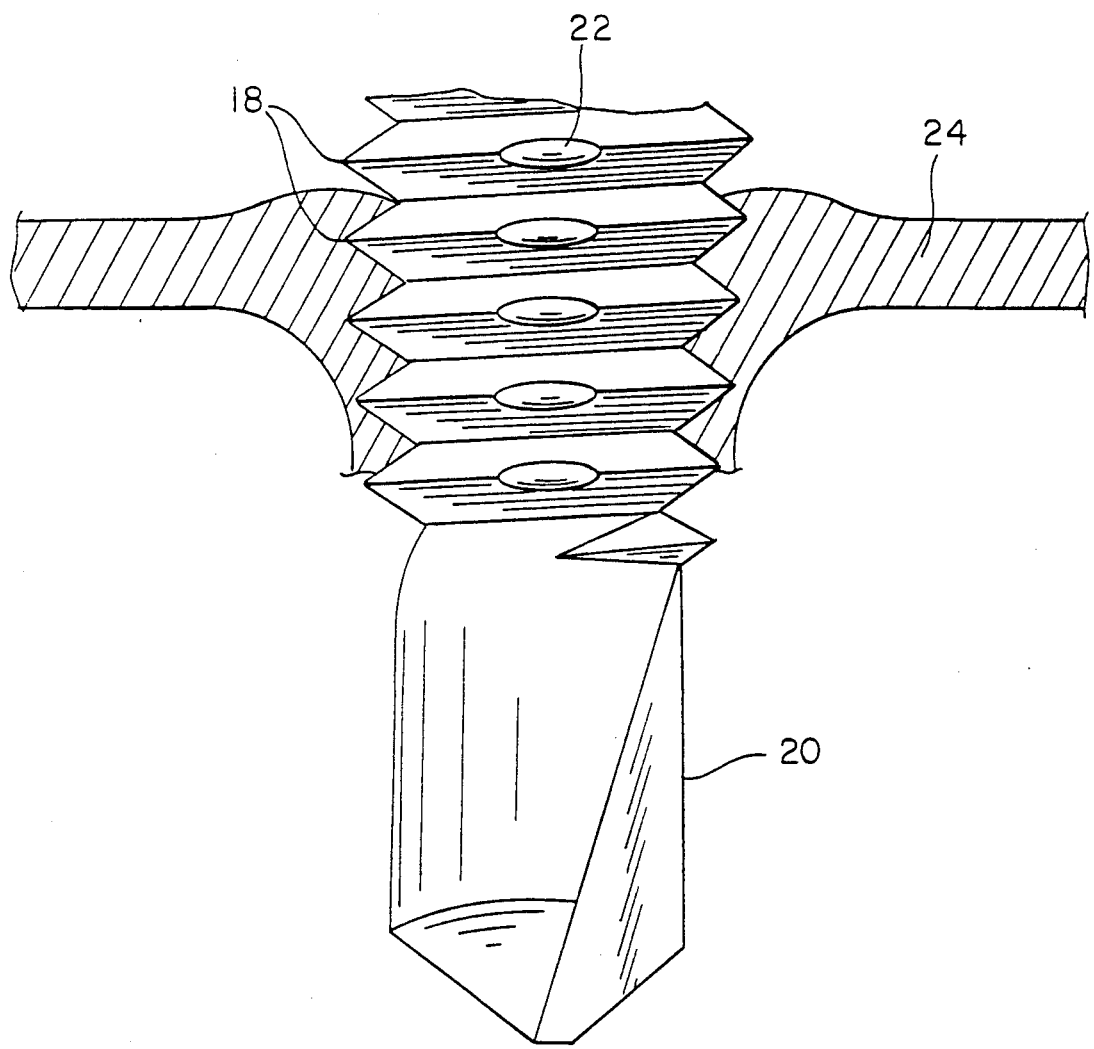
FIG. 4 is a view illustrating the action of the self drilling screw as it enters the thin sheet.

The point 20 of the self drilling screw has a diameter substantially smaller than the diameter of the non-tapered threaded portion (about 55% of the outer diameter of the non-tapered threaded portion) and will drill its own hole in the thin metal sheet 24. This could be achieved for example by putting a number 4 point on an 8 size screw. "Thin" generally refers to sheets having a thickness no more than about sixty thousandths of an inch 0.060 inch) and as shown, the thickness of the sheet 24 is about 30 thousandths 0.030 inch) and corresponds roughly to a single thread pitch. As the extended length threaded taper engages the thin metal sheet (FIG. 4) the metal is gradually swaged outward from the hole, due to the slight taper, into the thread form of the screw extending the effective thickness of the sheet in the area of the screw to achieve a very secure and tight fit to the root diameter of the screw. To maximize engagement, the formed threads are machine threads (UNF fine threads are depicted in the disclosed embodiment).

Strip out torque is dramatically increased with this design (up to 5.5 time higher) relative to traditional self drilling screws. With this higher strip out torque achieved, the screw can be driven at higher RPM's eliminating the need to reduce drive speed and torque as the head comes into contact with the surface. As a result, the drive to strip ratio is greatly enhanced (up to a 5 to 1 ratio) over conventional designs.

We claim:

1. A self drilling screw for thin metal applications comprising
   a central non-tapered threaded portion,
   a head at one end of said central portion,
   a hole cutting point for cutting a hole substantially smaller than the outer diameter of said central portion, and
   an extended length taper interconnecting said point and said central portion including a plurality of thread pitches each having a plurality of swaging lobes,
   the number of thread pitches within said extended length taper being selected so that the metal sheet about the hole will be swaged outwardly into the thread form of the screw.

2. A self drilling screw according to claim 1 wherein said thread is a machine thread.

3. A self drilling screw according to claim 2, wherein said extended length taper includes at least four thread pitches.

4. A self drilling screw according to claim 1, wherein the forward edge of said cutting point is on said taper.

5. A self drilling screw according to claim 1 wherein the outer diameter of said point is about 55% of the outer diameter of said non-tapered threaded portion.

* * * * *